US 6,718,118 B1

(12) United States Patent
Oguro

(10) Patent No.: US 6,718,118 B1
(45) Date of Patent: Apr. 6, 2004

(54) IMAGE PROCESSING APPARATUS, IMAGE PROCESSING METHOD, AND INFORMATION PROVIDING MEDIUM

(75) Inventor: Masaki Oguro, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/495,228

(22) Filed: Jan. 31, 2000

(30) Foreign Application Priority Data

Feb. 16, 1999 (JP) .......................................... P11-037356

(51) Int. Cl.$^7$ ................................................. H04N 5/91
(52) U.S. Cl. ......................... 386/46; 386/117; 386/131; 358/909.1
(58) Field of Search .......................... 386/46, 131, 117; 348/231.99, 231.9, 207.99, 231.8, 375; 358/906, 909.1; H04N 5/91

(56) References Cited

U.S. PATENT DOCUMENTS

| 5,488,433 A | | 1/1996 | Washino et al. |
| 5,553,864 A | * | 9/1996 | Sitrick .......................... 463/31 |
| 5,764,800 A | | 6/1998 | Yamagata |
| 5,821,996 A | | 10/1998 | Kawamura et al. |
| 5,862,218 A | | 1/1999 | Steinberg |
| 6,020,982 A | * | 2/2000 | Yamauchi et al. ....... 358/909.1 |

FOREIGN PATENT DOCUMENTS

| EP | 0 823 816 | 2/1998 |
| EP | 0 859 269 | 8/1998 |
| WO | WO 98/18255 | 4/1998 |

* cited by examiner

*Primary Examiner*—Vincent Boccio
(74) *Attorney, Agent, or Firm*—Oblon, Spivak, McClelland, Maier & Neustadt, P.C.

(57) ABSTRACT

An image processing apparatus and method for facilitating a still image copying operation between a plurality of storage media. Under the control of the controller 67, a DV/digital video data converter 62, a digital video data/analog converter 63, and a digital video data/JPEG converter 64 convert input digital video data into a still image, convert the still image into digital video data or an analog video signal, and convert an input analog video signal into a still image. Under the control of the controller 67, a PC card interface 65 stores the still image into a PC card 9 and reads the still image therefrom. Under the control of the controller 67, a Memory Stick interface 66 stores a still image into a Memory Stick 10 and reads the still image therefrom.

12 Claims, 15 Drawing Sheets

IMAGE PROCESSING APPARATUS, IMAGE PROCESSING METHOD, AND INFORMATION PROVIDING MEDIUM

BACKGROUND OF THE INVENTION

The present invention relates generally to an image processing apparatus, an image processing method, and an information providing medium and, more particularly, to an image processing apparatus, an image processing method, and an information providing medium that perform conversion between digital video data and analog video signal.

With popularization of combination digital camera/recorder systems, signal converters for performing conversion between digital video data and analog video signal have started to be used. These signal converters convert digital video data into analog video signals and vice versa.

Image processors such as personal computers incorporating a video capture board are in use to store still images included in digital video data or analog video signals.

On the other hand, digital still cameras often use a PCMCIA (Personal Computer Memory Card International Association) card or simply a PC card, a flash memory chip, or a Memory Stick (trademark of Sony Corporation), a recordable IC memory card, as a storage medium for storing still images.

SUMMARY OF THE INVENTION

However, storing still images included in digital video data or analog video signals into a PC card, a flash memory chip, or a Stick Memory (trademark) requires an image processor such as a personal computer on which these storage media can be loaded, requiring a very cumbersome task.

Copying a still image stored in a Memory Stick for example into a PC card requires a personal computer to be adapted to load these storage media, requiring a yet cumbersome task.

It is therefore an object of the present invention to provide an image processing apparatus and an image processing method that facilitate the storing of still images included in digital video data or analog video signals into storage media and the copying of the still images between these storage media.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
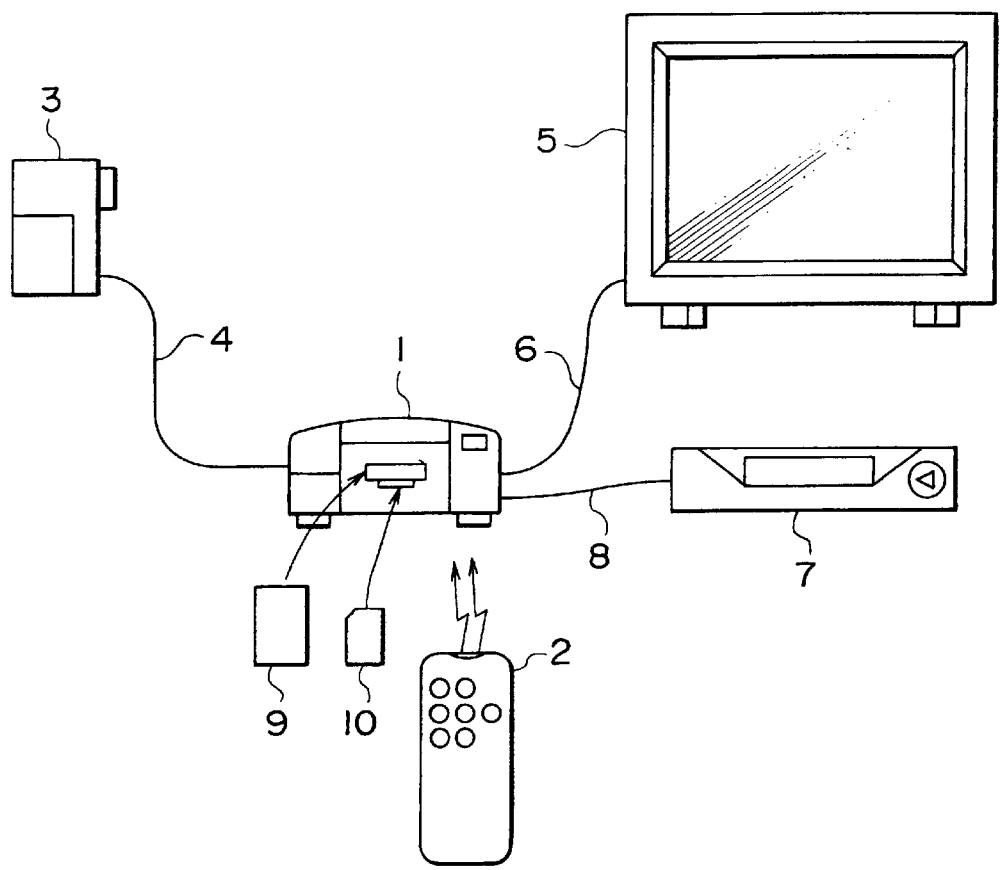
FIG. 1 is a schematic diagram illustrating a signal converter 1 practiced as one embodiment of the invention.

Now referring to FIG. 1, a signal converter 1 is remotely controlled by a remote commander 2. The signal converter 1 is connected to a video camera integrated digital VTR (Video Tape Recorder) 3 through an IEEE (Institute of Electrical and Electronics Engineers) 1394 serial bus 4. The signal converter 1 outputs digital video data of DV (Digital Video) VCR (Video Cassette Recorder) format to the digital VTR 3 and receives therefrom digital video data of DV VCR format. That is to say, the IEEE 1394 is used as a digital interface between the signal converter 1 and the digital VTR 3.

The signal converter 1 outputs an analog video signal to a monitor 5 through a cable 6 and receives an analog video signal from a VTR 7 through a cable 8.

The signal converter 1 converts digital video data received from the digital VTR 3 into an analog video signal and outputs it to the monitor 5. Or the signal converter 1 converts an analog video signal received from the VTR 7 into digital video data and outputs the same to the digital VTR 3. Or the signal converter 1 outputs an analog video signal received from the VTR 7 directly to the monitor 5.

The signal converter 1 is loaded with a PC card 9 or a Memory Stick 10 incorporated with a predetermined memory, converts the inputted digital video data or analog video signal into a still image according to a predetermined operation by a user, and stores the obtained still image into the loaded PC card 9 or the Memory Stick 10.

The signal converter 1 converts a still image stored in the loaded PC card 9 or Memory Stick 10 into an analog video signal and output it to the monitor 5. The signal converter 1 converts a still image stored in the loaded PC card 9 or Memory Stick 10 into digital video data and outputs the same to the digital VTR 3.

The signal converter 1 copies a still image stored in the loaded PC card 9 to the loaded Memory Stick 10 according to a predetermined operation by the user. Conversely, the signal converter 1 copies a still image stored in the loaded Memory Stick 10 to the loaded PC card 9.

The voice processing to be executed by the signal converter 1 will be skipped.

Figure 2:
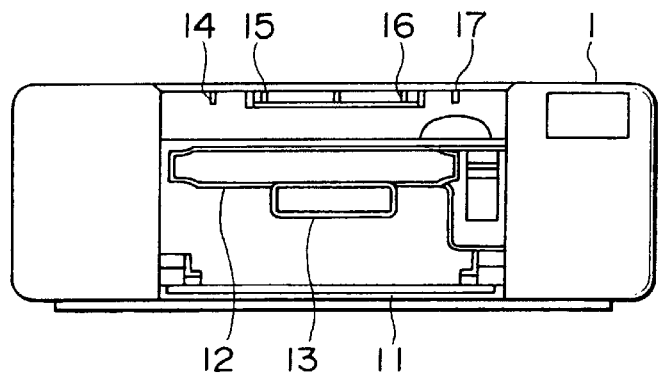
FIG. 2 is a front view of the signal converter 1 with its cover 11 opened.
Figure 3:
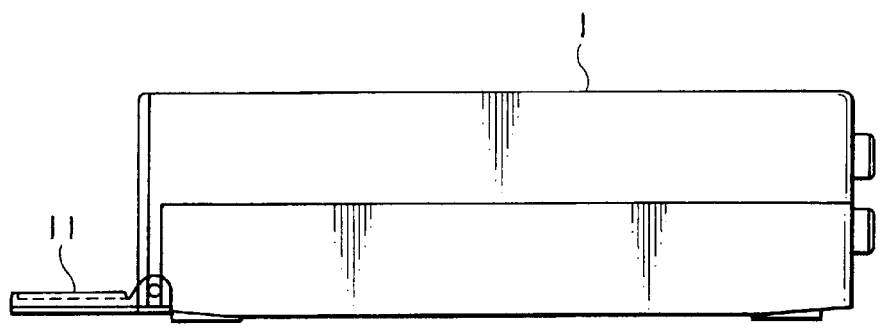
FIG. 3 is a right side view of the signal converter 1 with its cover 11 opened.

Referring to FIGS. 2 and 3, a PC card connector 12 is loaded with the PC card incorporating a predetermined memory. A Memory Stick connector 13 is inserted with the Memory Stick 10. The Memory Stick 10 loaded in the Memory Stick connector 13 may be unloaded when the user presses it again.

A LED (Light Emitting Diode) 14 displays a state of the Memory Stick 10 loaded on the Memory Stick connector 13; for example, whether data are written to or an error occurred on the Memory Stick 10. A LED 15 goes on when an analog video signal is inputted from the VTR 7 into the signal converter 1. A LED 16 goes on when digital video data are inputted from the digital VTR 3 into the signal converter 1. A LED 17 displays a state of the loaded PC card; for example, whether data are written to or an error occurred on the PC card 9 loaded on the PC card connector 12.

Figure 4:
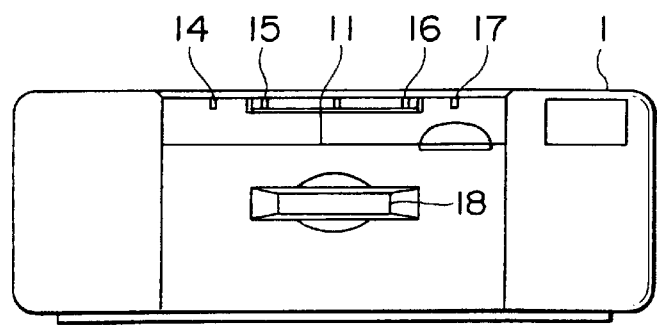
FIG. 4 is a front view of the signal converter 1 with its cover 11 closed.
Figure 5:
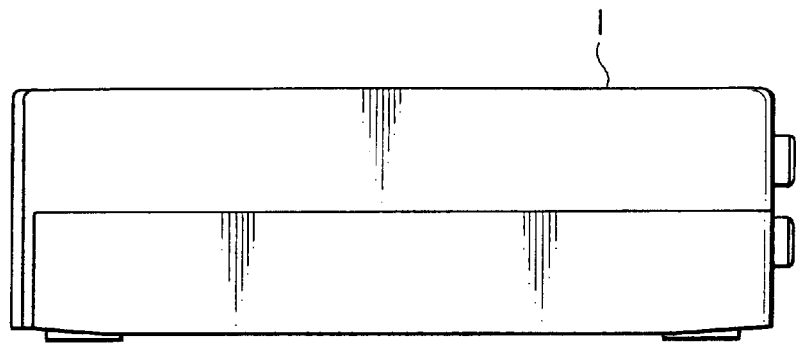
FIG. 5 is the right side view of the signal converter 1 with its cover 11 closed.

Referring to FIGS. 4 and 5, when a cover 11 of the signal converter 1 is closed, the PC card connector 12 is covered (or the opening is blocked), disabling the user to take the PC card 9 out of the PC card connector 12 or load the PC card 9 on the PC card connector 12.

On the other hand, even if the cover 11 is closed, a hole 18 provided in the cover 11 allows the user to take the Memory Stick 10 out of the Memory Stick connector 13 (when the loaded Memory Stick 10 is pressed into the Memory Stick connector 13, the top of the Memory Stick 10 projects from the Memory Stick connector 13 to allow the user to hold the top between fingers) or the Memory Stick 10 can be loaded into the Memory Stick connector 13.

Figure 6:
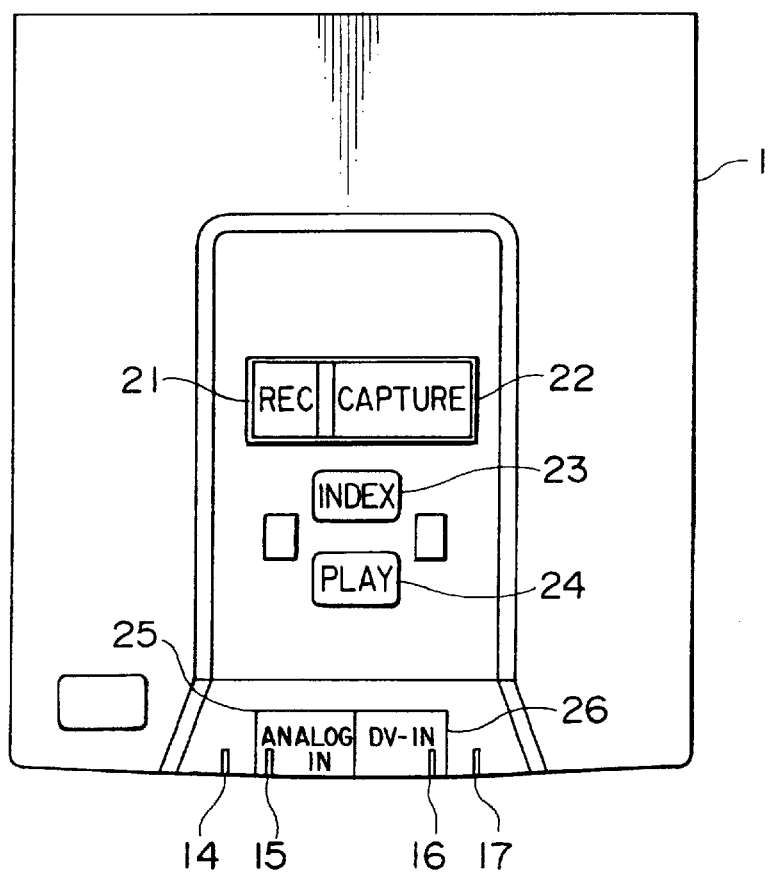
FIG. 6 is a top view of the signal converter 1.

Referring to FIG. 6, the signal converter 1 is arranged on the top side thereof with a record button 21, a capture button 22, an index button 23, a play button 24, an analog input select button 25, and a DV input select button 26. The record button 21 is operated when storing a still image included in the input analog video signal or digital video data into the Memory Stick 10 loaded in the Memory Stick connector 13 or the PC card 9 loaded in the PC card connector 12.

The capture button 22 is operated to temporarily stop (or capture) a moving image displayed on the monitor 5 before storing a still image included in the inputted analog video signal or digital video data into the Memory Stick 10 loaded in the Memory Stick connector 13 or the PC card 9 loaded in the PC card connector 12.

The index button 23 is operated when displaying on the monitor 5 a plurality of still-image thumbnail pictures stored in the Memory Stick 10 loaded in the Memory Stick connector 13 or the PC card 9 loaded in the PC card connector 12.

The play button 24 is operated when displaying on the monitor 5 a still image stored in the Memory Stick 10 loaded in the Memory Stick connector 13 or the PC card 9 loaded in the PC card connector 12.

The analog input select button 25 is operated when inputting an analog video signal from the VTR 7 to the signal converter 1. The DV input select button 26 is operated when inputting digital video data from the digital VTR 3 to the signal converter 1.

The turn on/off states of the LED 14, LED 15, LED 16, and LED 17 can also be confirmed from the top side of the signal converter 1.

Figure 7:
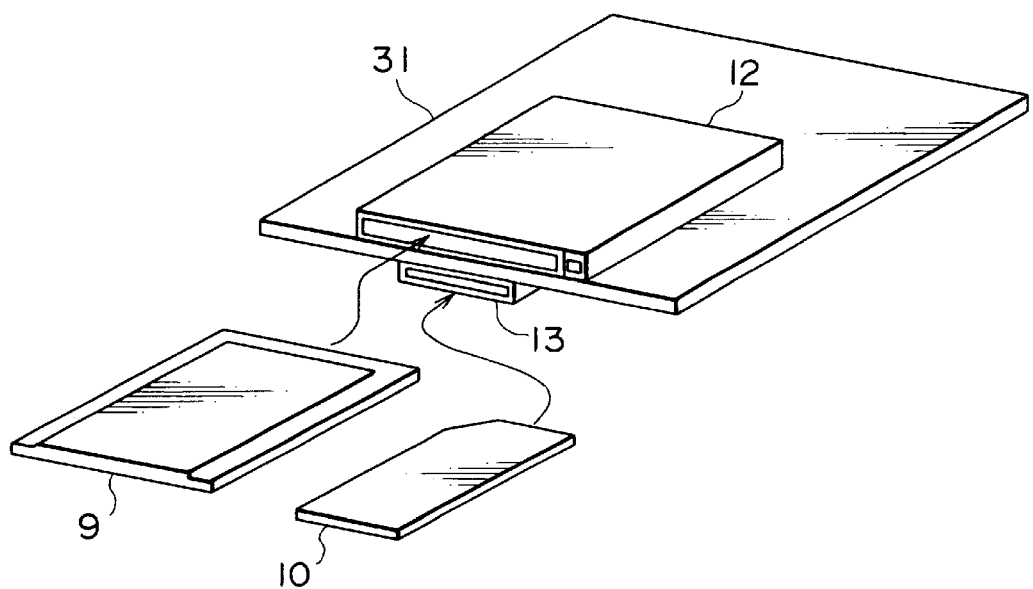
FIG. 7 is a perspective view illustrating a state in which a PC card connector 12 and a Memory Stick connector 13 are mounted on a board 31.

Referring to FIG. 7, there is shown a state in which the PC card connector 12 and the Memory Stick connector 13 amounted on a board 31 on which predetermined components of the signal converter 1 are mounted. As shown, the PC card connector 12 is fixed to the upper surface of the board 31. The Memory Stick connector 13 is fixed to the lower surface of the board 31, the opening through which the Memory Stick 10 is loaded being oriented in the same direction as the opening of the PC card connector 12 through which the PC card 9 is loaded, the vertical centers of these openings being in general alignment with each other.

Because the openings of the PC card connector 12 and the Memory Stick connector 13 are oriented in the same direction and the vertical centers of the openings of these connectors are in general alignment with each other, the areas on the board 31 necessary for mounting these connectors are minimized, thereby reducing the signal converter 1 in physical size.

Figure 8:
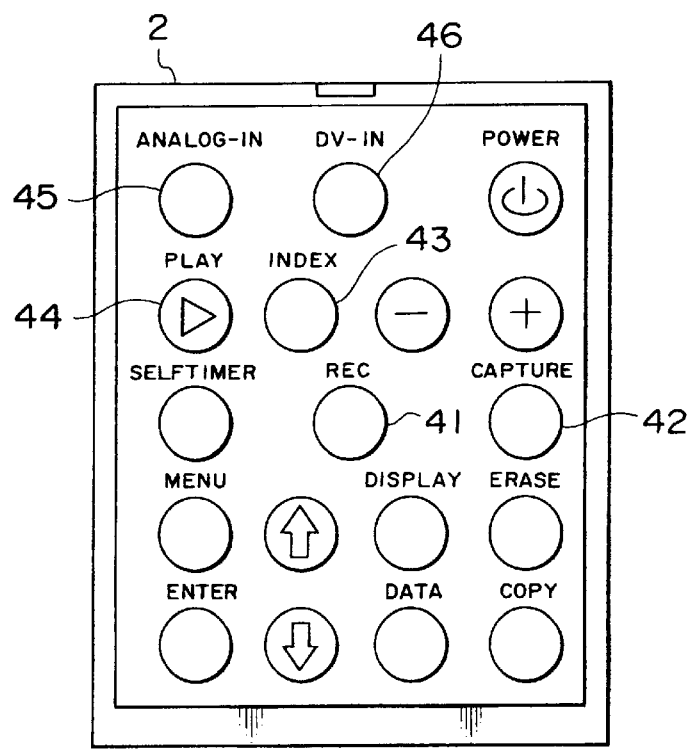
FIG. 8 shows a front view of a remote commander 2.

Referring to FIG. 8, the remote commander 2 has a record button 41, a capture button 42, an index button 43, a play button 44, an analog input select button 45, and a DV input select button 46. The record button, corresponding to the record button 21 of the signal converter 1, is operated to store a still image included in the inputted analog video signal or digital video data into the Memory Stick 10 loaded in the Memory Stick connector 13 or the PC card 9 loaded in the PC card connector 12.

The capture button 42, corresponding to the capture button 22 of the signal converter 1, is operated to temporarily stop (or capture) a moving image displayed on the monitor 5 when storing a still image included in the inputted analog video signal or digital video data into the Memory Stick 10 loaded in the Memory Stick connector 13 or the PC card 9 loaded in the PC card connector 12.

The index button 43, corresponding to the index button 23 of the signal converter 1, is operated to display on the monitor 5 an index of a still image stored in the Memory Stick 10 loaded in the Memory Stick connector 13 or the PC card 9 loaded in the PC card connector 12.

The play button 44, corresponding to the play button 24 of the signal converter 1, is operated to display on the monitor 5 a still image stored in the Memory Stick 10 loaded in the Memory Stick connector 13 or the PC card 9 loaded in the PC card connector 12.

The analog input select button 45, corresponding to the analog input select button 25 of the signal converter 1, is operated to input an analog video signal from the VTR 7 to the signal converter 1. The DV input select button 46, corresponding to the DV input select button 26 of the signal converter 1, is operated to input digital video data from the digital VTR 3 to the signal converter 1.

Figure 9:
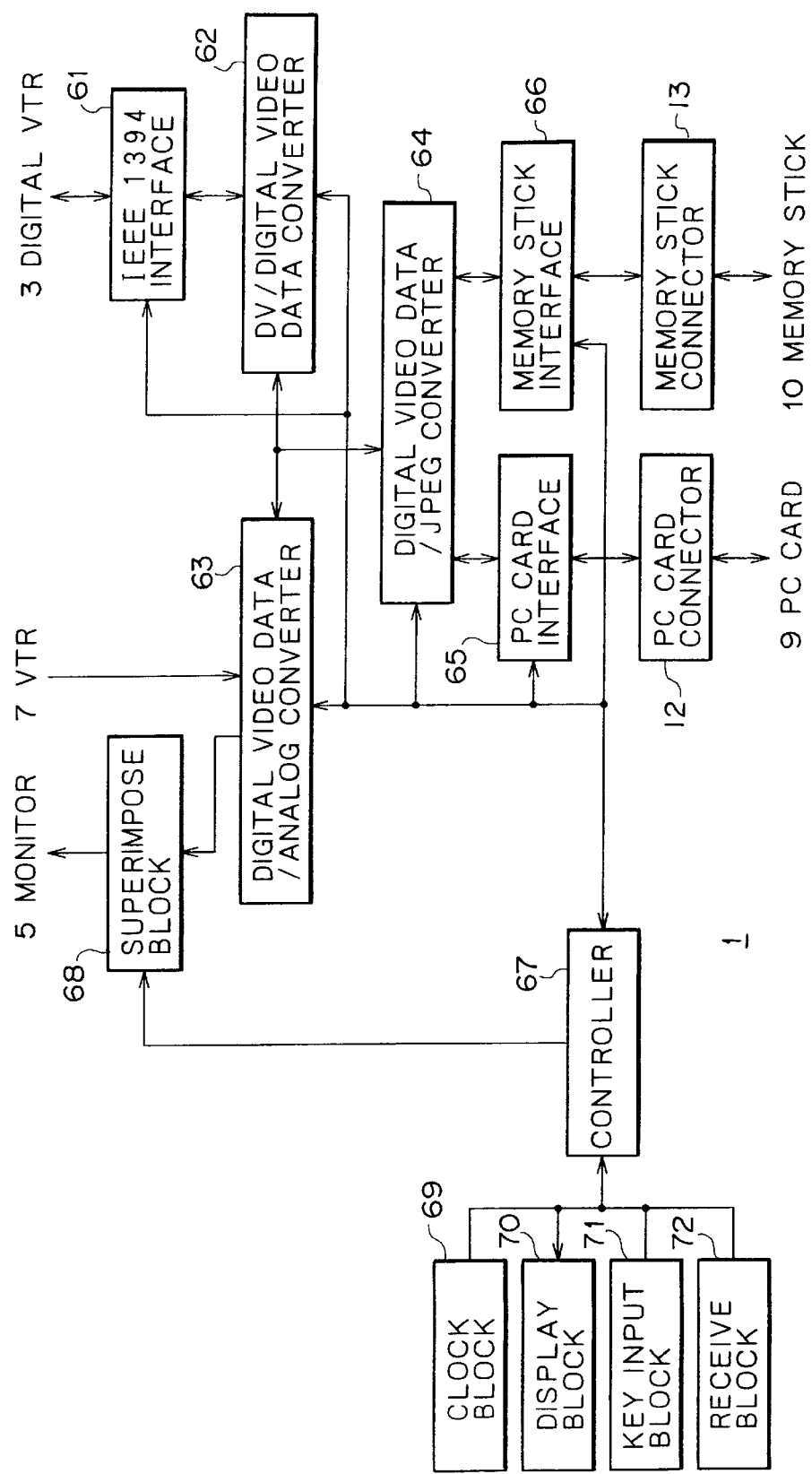
FIG. 9 is a block diagram illustrating the configuration of the signal converter 1.

Referring to FIG. 9, an IEEE 1394 interface 61 is an input/output interface connected to one end of the IEEE 1394 serial bus 4, the other end thereof being connected to the digital VTR 3. Under the control of a controller 67, the IEEE 1394 interface 61 supplies digital video data from the digital VTR 3 to a DV/digital video data converter 62 through the IEEE 1394 serial bus 4 and digital video data from the DV/digital video data converter to the digital VTR 3 through the IEEE 1394 serial bus.

When the digital video data are inputted from the digital VTR 3 into the signal converter 1, the DV/digital video data converter 62, under the control of the controller 67, converts the digital video data having DV VCR format supplied from the IEEE 1394 interface 61 into internal digital video data and supplies the same to a digital video data/analog converter 63 and a digital video data/JPEG (Joint Photographic Experts Group) converter 64. When an analog video signal is inputted from the VTR 7 into the signal converter 1, the DV/digital video data converter 62 converts the internal digital video data supplied from the digital video data/analog converter 63 into digital video data of DV VCR format, supplying it to the IEEE 1394 interface 61.

The DV/digital video data converter 62 converts the internal digital video data supplied from the digital video data/JPEG converter 64 into digital video data of DV VCR format and supplies it to the IEEE 1394 interface 61.

When digital video data are inputted from the digital VTR 3 into the signal converter 1, the digital video data/analog converter 63, under the control of the controller 67, converts the internal digital video data supplied from the DV/digital video data converter 62 into an analog video signal and supplies it to a superimpose block 68. When an analog video signal is inputted in the signal converter 1, the digital video data/analog converter 63 converts the analog video signal supplied from the VTR 7 into internal digital video data and supplies the same to the DV/digital video data converter 62 and the digital video data/JPEG converter 64.

Under the control of the controller 67, the digital video data/JPEG converter 64 converts the internal digital video data supplied from the DV/digital video data converter 62 or the digital video data/analog converter 63 into JPEG still image data and outputs the same to a PC card interface 65 and a Memory Stick interface 66. Also, the digital video data/JPEG converter 64 converts the JPEG still image data supplied from the PC card interface 65 or the Memory Stick interface 66 into internal digital video data and supplies the same to the DV/digital video data converter 62 and the digital video data/analog converter 63.

Under the control of the controller 67, the PC card interface 65 stores the JPEG still image data supplied from the digital video data/JPEG converter 64 into the PC card 9 loaded in the PC card connector 12. Also, the PC card interface 65 reads the JPEG still image data from the PC card 9 loaded in the PC card connector 12 and outputs the read data to the digital video data/JPEG converter 64.

Under the control of the controller 67, the Memory Stick interface 66 stores the JPEG still image data supplied from the digital video data/JPEG converter 64 into the Memory Stick 10 loaded in the Memory Stick connector 13. Also, the Memory Stick interface 66 reads the JPEG still image data from the Memory Stick 10 loaded in the Memory Stick connector 13 and outputs the read data to the digital video data/JPEG converter 64.

On the basis of the signals supplied from a key input block 71 or a receive block 72, the controller 67 controls the IEEE 1394 interface, the DV/digital video data converter 62, the digital video data/analog converter 63, the digital video data/JPEG converter 64, the PC card interface 65, the Memory Stick interface 66, the superimpose block 68, and a display block 70.

The superimpose block 68, under the control of the controller 67, superimposes a predetermined icon or character signal indicative of the state of the signal converter 1 onto an analog video signal supplied from the digital video data/analog converter 63 and outputs the resultant signal to the monitor 5 through the cable 6.

The clock block 69 supplies the data indicative of date and time to the controller 67. The display block 70, composed of the LED 14, the LED 15, the LED 16, and LED 17, and a LED drive block for driving these LEDs, turns off these LEDs, and turns on or flashes them in a predetermined color under the control of the controller 67.

The key input block 71 is composed of the record button 21, the capture button 22, the index button 23, the play button 24, the analog input select button 25, and the DV input select button 26 and supplies signals associated with the operations of these buttons to the controller 67. The receive block 72 receives in infrared radiation signal from the remote commander 2 and supplies a signal corresponding to a flash pattern (corresponding to each of the operations of the record button 41, the capture button 42, the index button 43, the play button 44, the analog input select button 45, and the DV input select button 46) of the infrared radiation signal to the controller 67.

Figure 10:
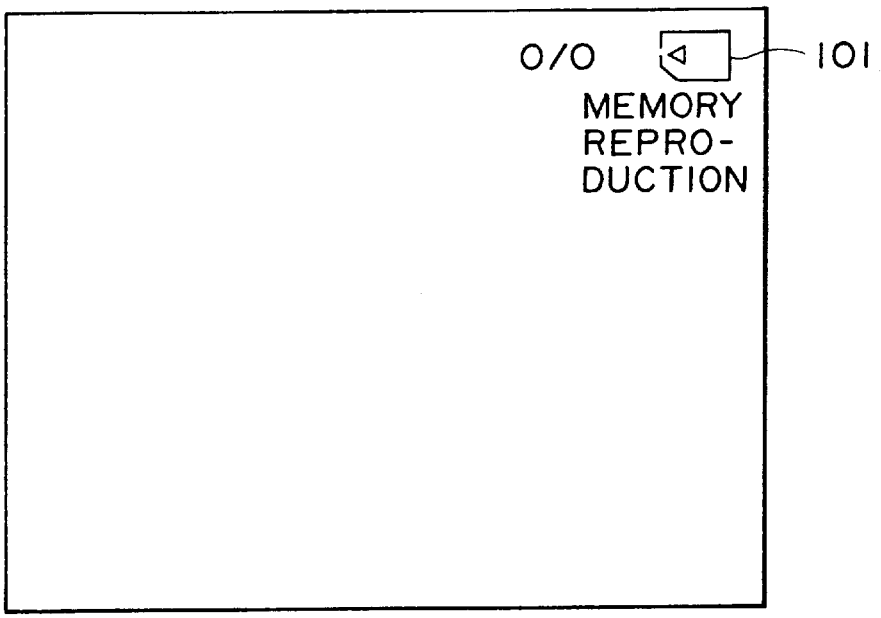
FIG. 10 exemplarily illustrates a screen displayed by the signal converter 1 onto a monitor 5.

Referring to FIG. 10, there is shown a screen, by way of example, which is displayed on the monitor 5 by the signal converter 1 when the play button 24 is pressed and the Memory Stick 10 storing no still image data is loaded in the Memory Stick connector 13. The signal converter 1 displays an icon 101 indicative of the Memory Stick 10 in the upper right corner of the screen on the monitor 5 and character string "MEMORY REPRODUCTION" below the icon 101. Also, the signal converter 1 displays, to the left of the icon 101, numbers "0/0" for example indicative that the Memory Stick 10 loaded in the Memory Stick connector 13 stores no still image data. The right-hand number indicates the number of still images stored in the loaded Memory Stick 10, while the left-hand number indicates the number of the current displayed still image among those stored in the Memory Stick 10 (in this example, no still image is stored in the Memory Stick 10 and therefore zero is shown on the blue background for example of the monitor screen).

Figure 11:
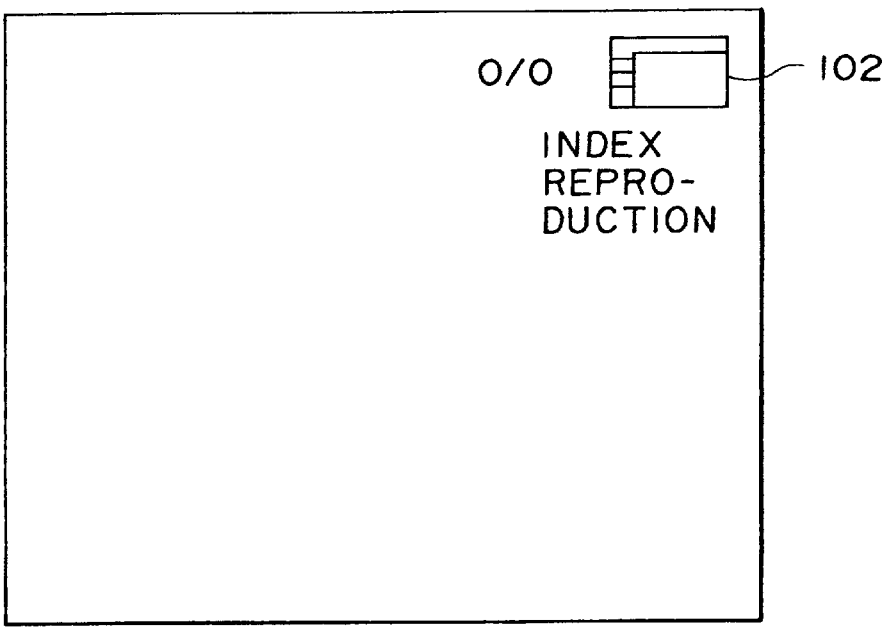
FIG. 11 exemplarily illustrates another screen displayed by the signal converter 1 onto the monitor 5.

Referring to FIG. 11, there is shown a screen, by way of example, which is displayed on the monitor 5 by the signal converter 1 when the index button 23 is pressed and the PC card 9 storing no still image data is loaded in the PC card connector 12. The signal converter 1 displays an icon 102 indicative of the PC card 9 in the upper right corner of the screen of the monitor 5 and character strings "INDEX REPRODUCTION" below the icon 102. Also, the signal converter 1 displays, to the left of the icon 102, numbers "0/0" for example indicative that the loaded PC card 9 stores no still image. These numbers have the same meaning as those of FIG. 10.

Figure 12:
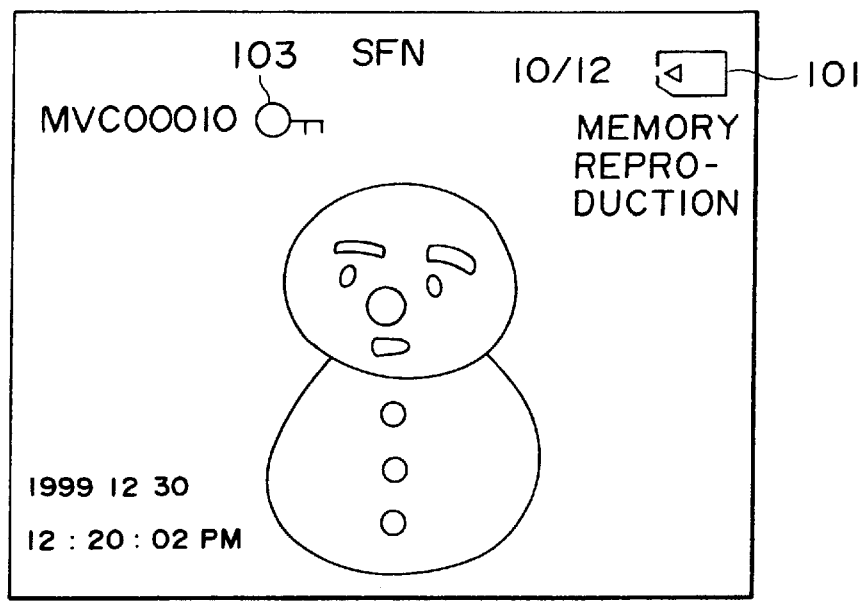
FIG. 12 exemplarily illustrates still another screen displayed by the signal converter 1 onto the monitor 5.

Referring to FIG. 12, there is shown a screen, by way of example, which is displayed on the monitor 5 by the signal processor 1 when the play button 24 is pressed and the Memory Stick 10 storing predetermined still image data is loaded in the Memory Stick connector 13. The signal converter 1 displays a predetermined image stored in the Memory Stick 10 onto the monitor 5.

As with the case described with reference to FIG. 10, the signal converter 1 displays the icon 101 indicative of the Memory Stick 10 in the upper right corner of the screen of the monitor 5 and character string "MEMORY REPRODUCTION" below the icon 101.

Also, the signal converter 1 displays, to the left of the icon 101, numbers "10/12" for example indicative that the loaded Memory Stick 10 stores 12 still images and the still image currently displayed on this screen is number "10". In addition, the signal converter 1 displays character string "SFN" in the upper center of the screen, "SFN" denoting the resolution of the currently displayed image. Furthermore, the signal converter 1 displays, in the upper left corner of the screen, a file name of the currently displayed image and an icon 103 indicative that the file of the currently display image is protected against deletion.

Also, the signal converter 1 displays, in the lower left corner of the screen, a date on which the still image data was stored in the Memory Stick 10. The user can set the signal converter 1 so that this date is not displayed.

Figure 13:
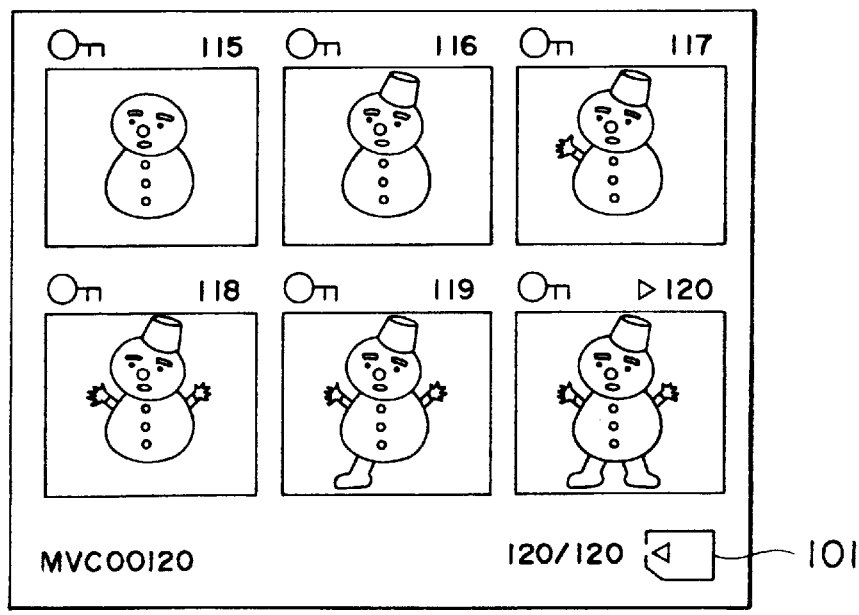
FIG. 13 exemplarily illustrates yet another screen displayed by the signal converter 1 onto the monitor 5.

Referring to FIG. 13, there shown a screen, by way of example, which is displayed by the signal converter 1 onto the monitor 5 when the index button 23 is pressed and the Memory Stick 10 storing predetermined still images is loaded in the Memory Stick connector 13. The signal converter 1 generates the predetermined number of thumbnail images from the images stored in the Memory Stick 10 and displays the generated thumbnail images and the files names corresponding to these thumbnail images onto the screen of the monitor 5. The signal converter 1 also displays, in the lower right corner of the screen, the icon 101 indicative of the Memory Stick 10.

The signal converter 1 displays, to the left of the icon 101 on the screen of the monitor 5, numbers "120/120" for example indicative that the Memory Stick 10 loaded in the Memory Stick connector 13 stores 120 still images and the last thumbnail image (the image having the greatest number) displayed on the screen of the monitor 5 is number "120". Further, the signal converter 1 displays a file name corresponding to the last image displayed on the monitor 5 in the lower left corner of the screen.

Figure 14:
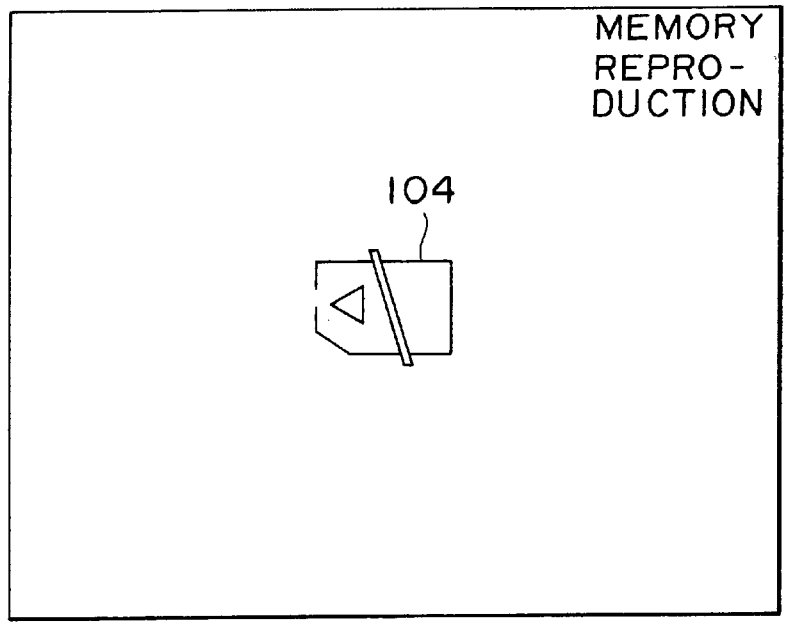
FIG. 14 exemplarily illustrates a different screen displayed by the signal converter 1 onto the monitor 5.

Referring to FIG. 14, there is shown a screen, by way of example, to be displayed by the signal converter 1 when the Memory Stick 10 is pulled out of the Memory Stick connector 13 while an image stored in the Memory Stick 10 loaded in the Memory Stick connector 13 is reproduced. If this happens, the signal converter 1 displays at the center of the screen, an icon 104 indicative of the pull-out.

Figure 15:
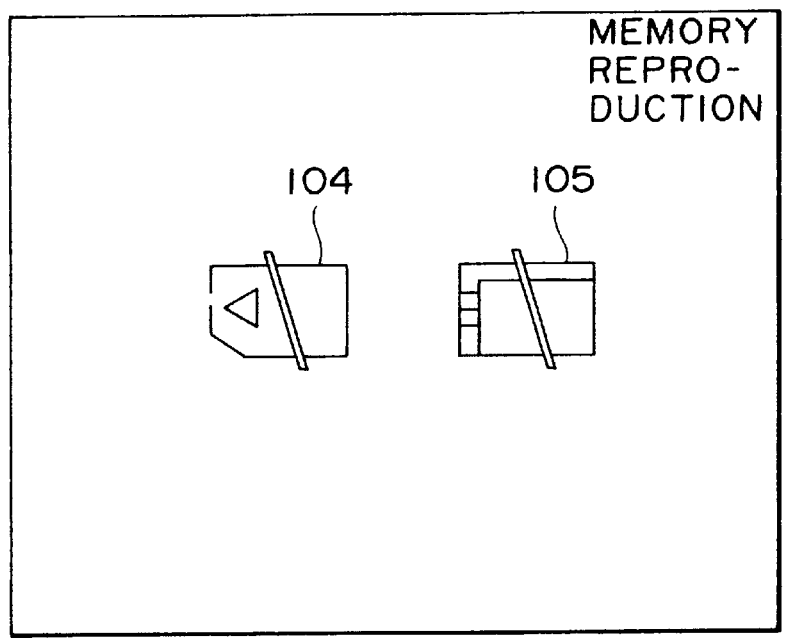
FIG. 15 exemplarily illustrates still different screen displayed by the signal converter 1 onto the monitor 5.

Referring to FIG. 15, there is shown a screen, by way of example, to be displayed by the signal converter 1 on the monitor 5 when the Memory Stick 10 is pulled out of the Memory Stick connector 13 and, at the same time, the PC card 9 is pulled out of the PC card connector 12 while an image stored in the Memory Stick 10 loaded in the Memory Stick connector 13 or an image stored in the PC card 9 loaded in the PC card connector 12 is reproduced. The signal converter 1 displays, side by side in the center of the screen, the icon 104 indicative of the pull-out of the Memory Stick 10 and an icon indicative of the pull-out of the PC card 9.

Figure 16:
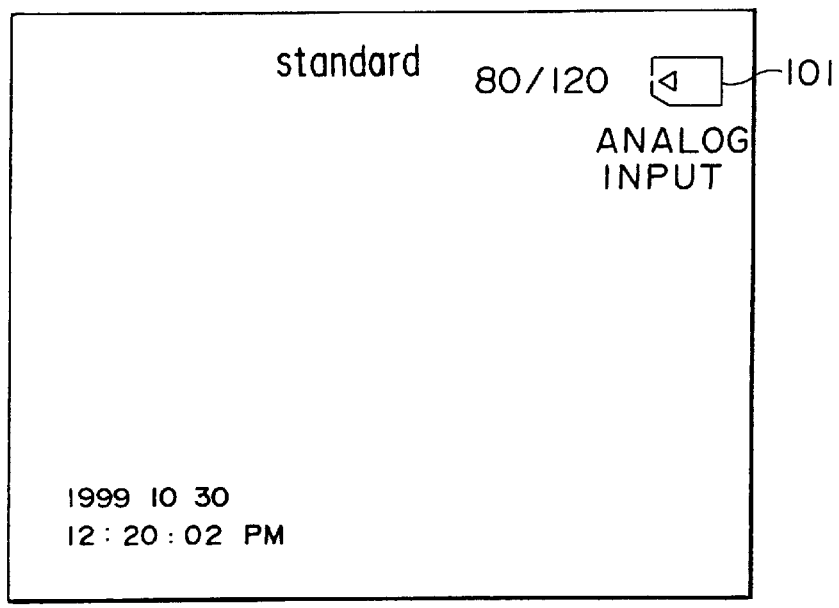
FIG. 16 exemplarily illustrates yet different screen displayed by the signal converter 1 onto the monitor 5.

Referring to FIG. 16, there is shown a screen, by way of example, to be displayed by the signal converter 1 on the monitor 5 when the data corresponding to a still image included in an analog video signal are stored in the Memory Stick 10 loaded in the Memory Stick connector 13 when the record button 21 is pressed by the user. The signal converter 1 displays the icon 101 indicative of the Memory Stick 10 in the upper right corner of the screen and character string "ANALOG INPUT" below the icon 101.

At the same time, the signal converter 1 displays, to the left of the icon 101, numbers "80/120" indicative of the state of the storage of the images in the Memory Stick 10 loaded in the Memory Stick connector 13. Number "120" indicates the maximum number of still images (generated at a predetermined data compression ratio) that can be stored in the Memory Stick 10 loaded in the Memory Stick connector 13. Number "80" indicates the number of images currently stored in the Memory Stick 10 loaded in the Memory Stick connector 13. The signal converter 1 displays, at the upper center of the screen, character "STANDARD" indicative of the still image compression ratio.

Further, the signal converter 1 displays, in the lower left corner of the screen, a date on which the still image file was stored in the Memory Stick 10. The user can set the signal converter 1 so that the date is not displayed.

Figure 17:
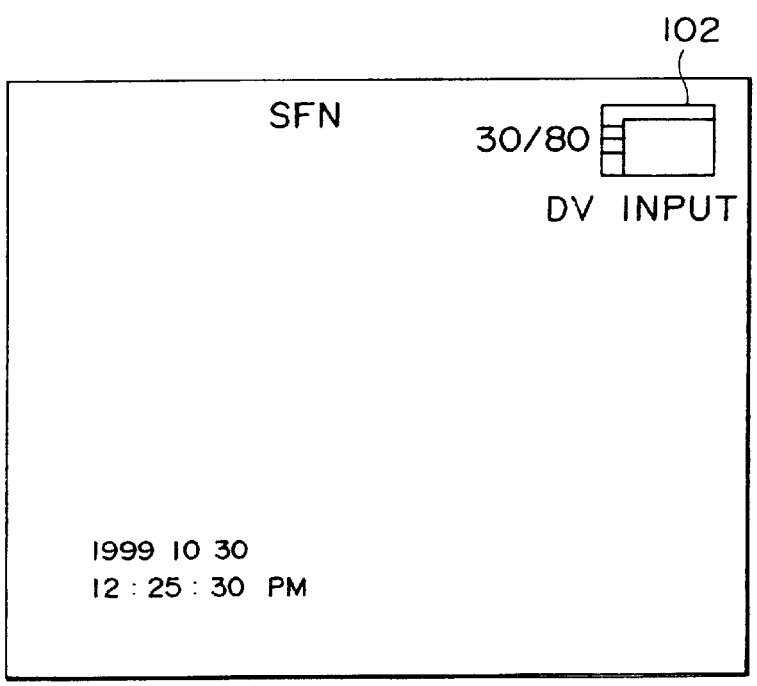
FIG. 17 exemplarily illustrates another screen displayed by the signal converter 1 onto the monitor 5.

Referring to FIG. 17, there is shown on a screen, by way of example, to be displayed by the signal converter 1 on the monitor 5 when the record button 21 is pressed and a still image included in digital video data is stored in the PC card 9 connected to the PC card connector 12. The signal converter 1 displays, in the upper right corner of the screen of the monitor 5, the icon 102 indicative of the PC card 9 and character string "DV INPUT" below the icon 102.

At the same time, the signal converter 1 displays, to the left of the icon 102, numbers "30/80" indicative of the state of the storage of images in the PC card 9 loaded in the PC card connector 12. The meanings of these numbers are the same as those shown in FIG. 16.

The signal converter 1 displays, at the upper center of the screen, character string "SFN" indicative of the data compression ratio of the still image and, in the lower left corner of the screen, the date on which the still image file was stored in the PC card 9. The user can set the signal converter 1 so that the date is not displayed.

Figure 18:
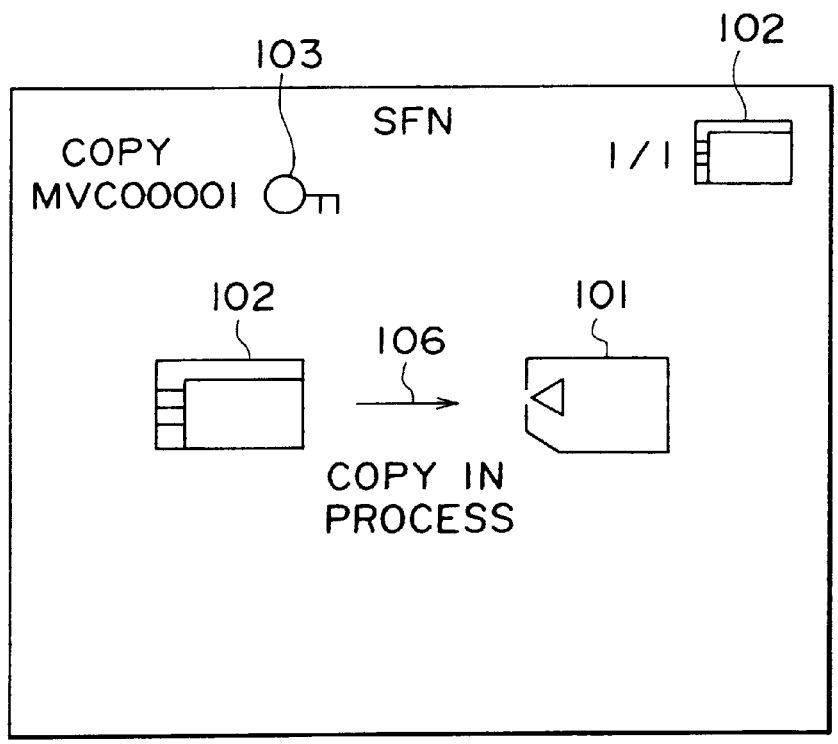
FIG. 18 exemplarily illustrates still another screen displayed by the signal converter 1 onto the monitor 5.

Referring to FIG. 18, there is shown a screen, by way of example, to be displayed by the signal converter 1 on the monitor 5 when a still image file stored in the PC card 9 loaded in the PC card connector 12 is copied into the Memory Stick 10 loaded in the Memory Stick connector 13. The signal converter 1 displays, in the center of the screen, the icon 102 indicative of the PC card 9, the icon 101 indicative of the Memory Stick 10, and an icon 106 indicative that the still image file is copied from the PC card 9 to the Memory Stick 10.

Figure 19:
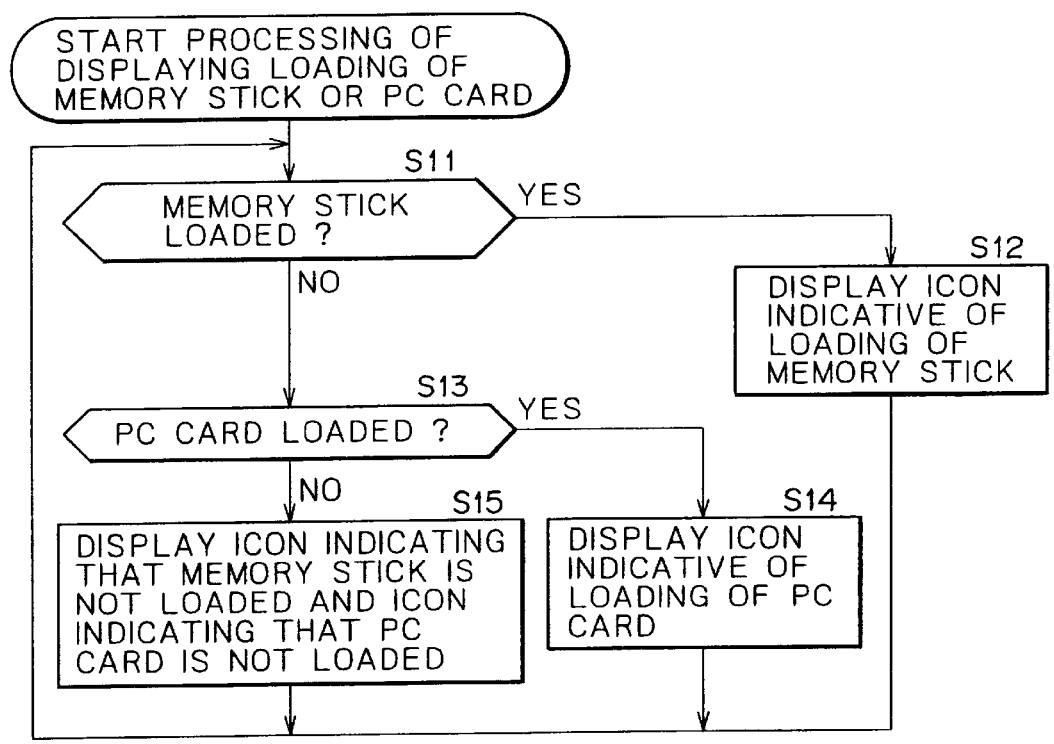
FIG. 19 is a flowchart for describing the processing of displaying an icon 101 indicative of a Memory Stick 10 or an icon 102 indicative of a PC card 9 onto the monitor 5.

The following describes, with reference to the flowchart shown in FIG. 19, the processing for displaying on the monitor 5 by the controller 67 of the signal converter 1 the icon 101 indicative of the Memory Stick 10 or the icon 102 indicative of the PC card 9 when the play button 24 or the index button 23 is pressed and the Memory Stick 10 or the PC card 9 is loaded. In step S11, the controller 67 determines, on the basis of a signal supplied from the Memory Stick interface 66, whether the Memory Stick 10 has been loaded in the Memory Stick connector 13. If the Memory Stick 10 is found loaded, then, in step S12, the controller 67 causes the superimpose block 68 to display the icon 101 indicative of the Memory Stick 10. Then, back to step S11, the controller 67 repeats the icon displaying processing.

In step S11, if the Memory Stick 10 is found not loaded in the Memory Stick connector 13, then, in step S13, the controller 67 determines, on the basis of a signal supplied from the PC card interface 65, whether the PC card 9 has been loaded in the PC card connector 12. If the PC card 9 is found loaded, then, in step S14, the controller 67 causes the superimpose block 68 to display the icon 102 indicative of the PC card 9. Then, back to step S11, the controller 67 repeats the icon display processing.

If the PC card is not found loaded in step S13, it indicates that neither the Memory Stick 10 nor the PC card 9 has been loaded. Then, in step S15, the controller 67 causes the superimpose block 68 to display the icon 104 indicative that the Memory Stick 10 is not loaded and the icon 105 indicative that the PC card is not loaded. Then, back to step S11, the controller 67 repeats the icon display processing until the Memory Stick 10 or the PC card 9 is loaded.

Thus, when the play button 24 or the index button 23 has been pressed and the Memory Stick 10 or the PC card 9 is loaded, the signal converter 1 displays the icon corresponding to the loaded Memory Stick 10 or the PC card 9 onto the screen of the monitor 5.

Figure 20:
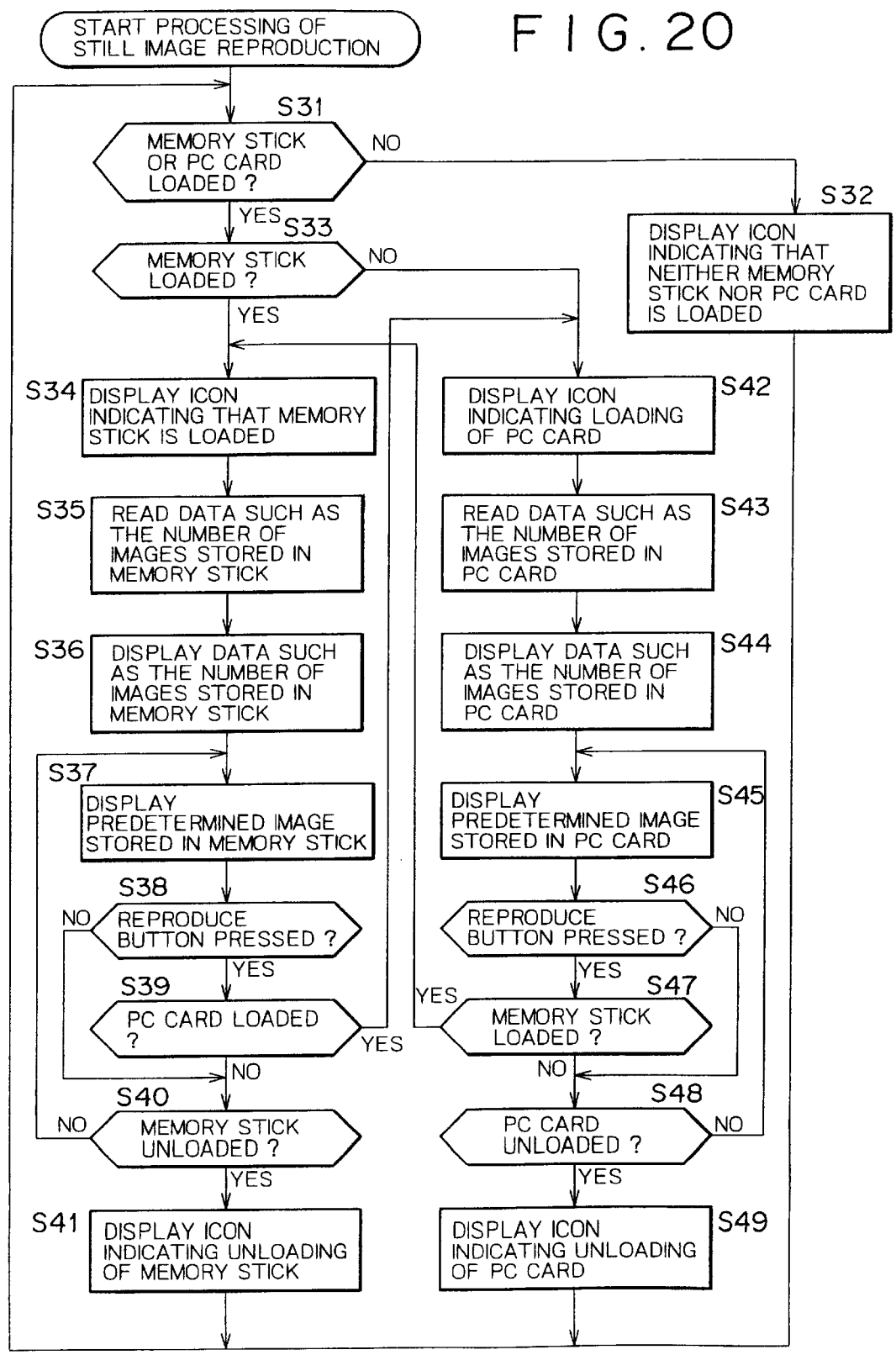
FIG. 20 is a flowchart for describing the processing of reproducing an image stored in the Memory Stick 10 or the PC card 9.

The following describes, with reference to the flowchart shown in FIG. 20, the processing of reproducing an image stored in the Memory Stick 10 loaded in the Memory Stick connector 13 or the PC card 9 loaded in the PC card connector 12. In step S31, the controller 67 of the signal converter 1 determines, on the basis of a signal supplied from the Memory Stick interface 66 and a signal supplied from the PC card interface 65, whether the Memory Stick 10 is loaded in the Memory Stick connector 13 or the PC card 9 is loaded in the PC card connector 12. If neither the Memory Stick 10 nor the PC card 9 is found loaded, then, in step S32, the controller 67 causes the superimpose block 68 to display the icon 104 indicative that the Memory Stick 10 is not loaded and the icon 105 indicative that the PC card 9 is not loaded. Then, back to step S31, the controller 67 repeats the processing until the Memory Stick 10 or the PC card 9 is loaded.

If, in step S31, the Memory Stick 10 or the PC card 9 is found loaded, then, in step S33, the controller 67 determines, on the basis of a signal supplied from the Memory Stick interface 66, whether the Memory Stick 10 is loaded in the Memory Stick connector 13. If the Memory Stick 10 is found loaded, then, in step S34, the controller 67 causes the superimpose block 68 to display the icon 101 indicative that the Memory Stick 10 is loaded.

In step S35, the controller 67 causes the Memory Stick interface 66 to read from the Memory Stick 10 the number of images stored therein and the data such as image data compression ratio. In step S36, the controller 67 causes the superimpose block 68 to display the number of images stored in the Memory Stick 10 and the data such as image data compression ratio.

In step S37, the controller 67 causes the Memory Stick interface 66 to read predetermined still image data from the Memory Stick 10 and supply the data to the digital video data/JPEG converter 64. The digital video data/JPEG converter 64 converts the supplied data having JPEG format into internal digital video data and supplies the resultant data to the digital video data/analog converter 63. The digital video data/analog converter 63 converts the supplied internal digital video data into an analog video signal and supplies it to the monitor 5 to display the predetermined still image.

In step S38, the controller 67 determines, on the basis of a signal supplied from the key input block 71, whether the play button 24 of the key input block 71 has been pressed. If the play button 24 is found pressed, it indicates that an image stored in the PC card 9 is reproduced, so that, in step S39, the controller 67 determines, on the basis of a signal supplied from the PC card interface 65, whether the PC card 9 is loaded in the PC card connector 12.

If, in step S39, the PC card 9 is found not loaded, then, in step S40, the controller 67 determines, on the basis of a signal supplied from the Memory Stick interface 66, whether the Memory Stick 10 has been pulled out of the Memory Stick connector 13. If the Memory Stick 10 is found pulled out, the controller 67 causes the superimpose block 68 to display the icon 104 indicative of the pull-out. Then, back to step S31, the controller 67 repeats the image reproduction processing.

If, in step S40, the Memory Stick 10 is found not pulled out, it indicates that an image stored in the Memory Stick 10 is reproduced, so that, back to step S37, the controller 67 repeats the image reproduction processing.

If, in step S38, the play button 24 is found not pressed, it indicates that an image stored in the Memory Stick 10 is successively reproduced, so that the controller 67 skips the processing of step S39 and executes the processing of step S40.

If, in step S39, the PC card 9 is found loaded, and if, in step S33, the Memory Stick 10 is found not loaded, it indicates that an image stored in the PC card 9 is reproduced. Then, in step S42, the controller 67 causes the superimpose block 68 to display the icon 102 indicative that the PC card 9 is loaded.

In step S43, the controller 67 causes the PC card interface 65 to read the number of images stored in the PC card 9 and the data such as image data compression ratio. In step S44, the controller 67 causes the superimpose block 68 to display the number of images stored in the PC card 9 and the data such as image data compression ratio.

In step S45, the controller 67 causes the PC card interface 65 to read the predetermined still image data from the PC card 9 and supplies the data to the digital video data/JPEG converter 64. The digital video data/JPEG converter 64 converts the still image data having JPEG format supplied from the PC card interface 65 into internal digital video data and supplies the same to the digital video data/analog converter 63. The digital video data/analog converter 63 converts the internal digital video data into an analog video signal and supplies it to the monitor 5 to display the predetermined still image.

In step S46, the controller 67 determines, on the basis of a signal supplied from the key input block 71, whether the play button 24 of the key input block 71 has been pressed. If the play button 24 is found pressed, it indicates that an image stored in the Memory Stick 10 is reproduced. Therefore, in step S47, the controller 67 determines, on the basis of a signal supplied from the Memory Stick interface 66, whether the Memory Stick 10 is loaded in the Memory Stick connector 13.

If, in step S47, the Memory Stick 10 is found not loaded, then, in step S48, the controller 67 determines, on the basis of a signal supplied from the PC card interface 65, whether the PC card 9 has been pulled out of the PC card connector 12. If the PC card 9 is found pulled out, the controller 67 causes the superimpose block 68 to display the icon 105 indicative of the pull-out. Then, back to step S31, the controller 67 repeats the image reproduction processing.

If, in step S48, the PC card 9 is found not pulled out, it indicates that an image stored in the PC card 9 is reproduced, so that, back to step S45, the controller 67 repeats the image reproduction processing.

If, in step S46, the play button 24 is found not pressed, it indicates that an image stored in the PC card 9 is successively reproduced, so that the controller 67 skips the processing of step S47 and executes the processing of step S48.

If, in step S47, the Memory Stick 10 is found not loaded, it indicates that an image stored in the Memory Stick 10 is reproduced. Then, in step S34, the controller 67 executes the processing for displaying the still image stored in the Memory Stick 10.

Thus, the signal converter 1 displays on the monitor 5 predetermined images stored in the Memory Stick 10 or the PC card 9. When the play button 24 is pressed while a still image stored in the Memory Stick 10 is displayed on the monitor 5, a predetermined image stored in the PC card 9 can also be displayed on the monitor 5. Conversely, when the play button 24 is pressed while a still image stored in the PC card 9 is displayed on the monitor 5, a predetermined still image stored in the Memory Stick 10 can also be displayed on the monitor 5.

Further, in the like processing, the signal converter 1 can convert predetermined still image data stored in the Memory Stick 10 or the PC card 9 into DV VCR digital video data and supply the same to the digital VTR 3.

Figure 21:
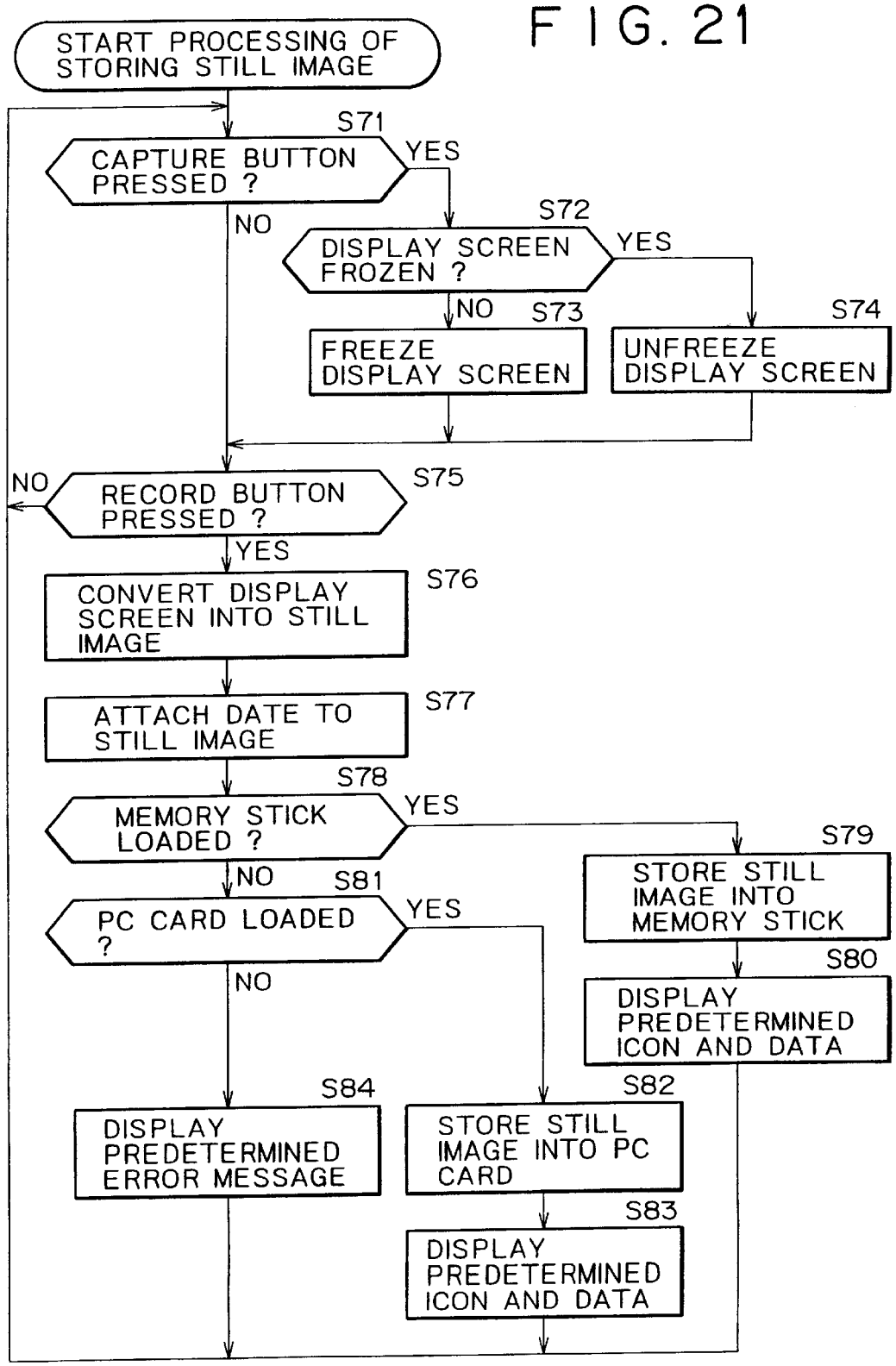
FIG. 21 is a flowchart for describing the processing of storing a still image into the Memory Stick 10 or the PC card 9.

The following describes, with reference to the flowchart shown in FIG. 21, the processing of storing a still image included in the digital video data supplied from the digital VTR 3 or a still image included in an analog video signal supplied from the VTR 7 into the Memory Stick 10 or the PC card 9. In step S71, the controller 67 of the signal converter 1 determines whether the capture button 22 of the key input block 71 has been pressed. If the capture button 22 is found pressed, then, in step S72, the controller determines, on the basis of a signal supplied from the digital video data/analog converter 63 or the DV/digital video data converter 62, whether an image displayed by the digital video data/analog converter 63 on the monitor 5 is frozen.

If, in step S72, the image is found not frozen, then, in step S73, the controller 67 causes the digital video data/analog converter 63 or the DV/digital video data converter 62 to freeze the image displayed on the monitor. Then, the controller 67 takes up the processing of step S75.

If, in step S72, the image is found frozen, then, in step S74, the controller 67 causes the digital video data/analog converter 63 or the DV/digital video data converter 62 to unfreeze the image. Then, the controller 67 takes up the processing of step S75.

If, in step S71, the capture button 22 is found not pressed, then the controller 67 skips the processing of steps S72 through S74 and takes up the processing of step S75.

In step S75, the controller 67 determines whether the record button 21 of the key input block 71 has been pressed. If the record button 21 is found pressed, then, in step S76, the controller causes the digital video data/JPEG converter 64 to convert the internal digital video data supplied from the digital video data/analog converter 63 or the DV/digital video data converter 62 into JPEG data and supply the same to the PC card interface 65 and the Memory Stick interface 66. In step S77, on the basis of the data supplied from the clock block 69 indicative of date and time, the controller 67 supplies data indicative of date and time to the PC card interface 65 and the Memory Stick interface 66.

In step S78, the controller 67 determines, on the basis of a signal supplied from the Memory Stick interface 66, whether the Memory Stick 10 is loaded in the Memory Stick connector 13. If the Memory Stick 10 is found loaded, the controller 67 causes the Memory Stick interface 66 to write the still image data and the date and time data to the Memory Stick 10. In step S80, the controller 67 causes the superimpose block 68 to display the predetermined icon and data. Then, back to step S71, the controller 67 repeats the still image storage processing.

If, in step S78, the Memory Stick 10 is found not loaded, then, in step S81, the controller 67 determines, on the basis of a signal supplied from the PC card interface 65, whether the PC card 9 is loaded in the PC card connector 12. If the PC card 9 is found loaded, then, in step S82, the controller causes the PC card interface 65 to write the still image data and the date and time data to the PC card 9. In step S83, the controller 67 causes the superimpose block 68 to display the predetermined icon and data on the monitor 5. Then, back to step S71, the controller 67 repeats the still image storage processing.

If, in step S81, the PC card 9 is found not loaded, it indicates that the data cannot be written. Therefore, in step S84, the controller 67 causes the superimpose block 68 to display a predetermined error message on the monitor 5. Then, back to step S71, the controller 67 repeats the still image storage processing.

If, in step S75, the record button is found not pressed, then, back to step S71, the controller 67 repeats the still image storage processing.

Thus, operating the capture button 22 allows the signal converter 1 to freeze an image to be displayed on the monitor 5. If the capture button 22 is not pressed but the record button 21 is pressed, then the signal converter 1 does not freeze an image to be displayed on the monitor 5 but stores the image into the Memory Stick 10 or the PC card 9.

Consequently, assume for example that the VTR 7, instead of the monitor 5, be connected to the analog video signal output terminal of the signal converter 1, the signal converter 1 convert the digital video data supplied from the digital VTR 3 into an analog video signal, and the VTR 7 record this video signal to a magnetic tape loaded on the VTR 7. Then, pressing only the record button 21 allows the signal converter 1 to store the predetermined still image into the Memory Stick 10 or the PC card 9 without affecting the image being recorded by the VTR 7.

Figure 22:
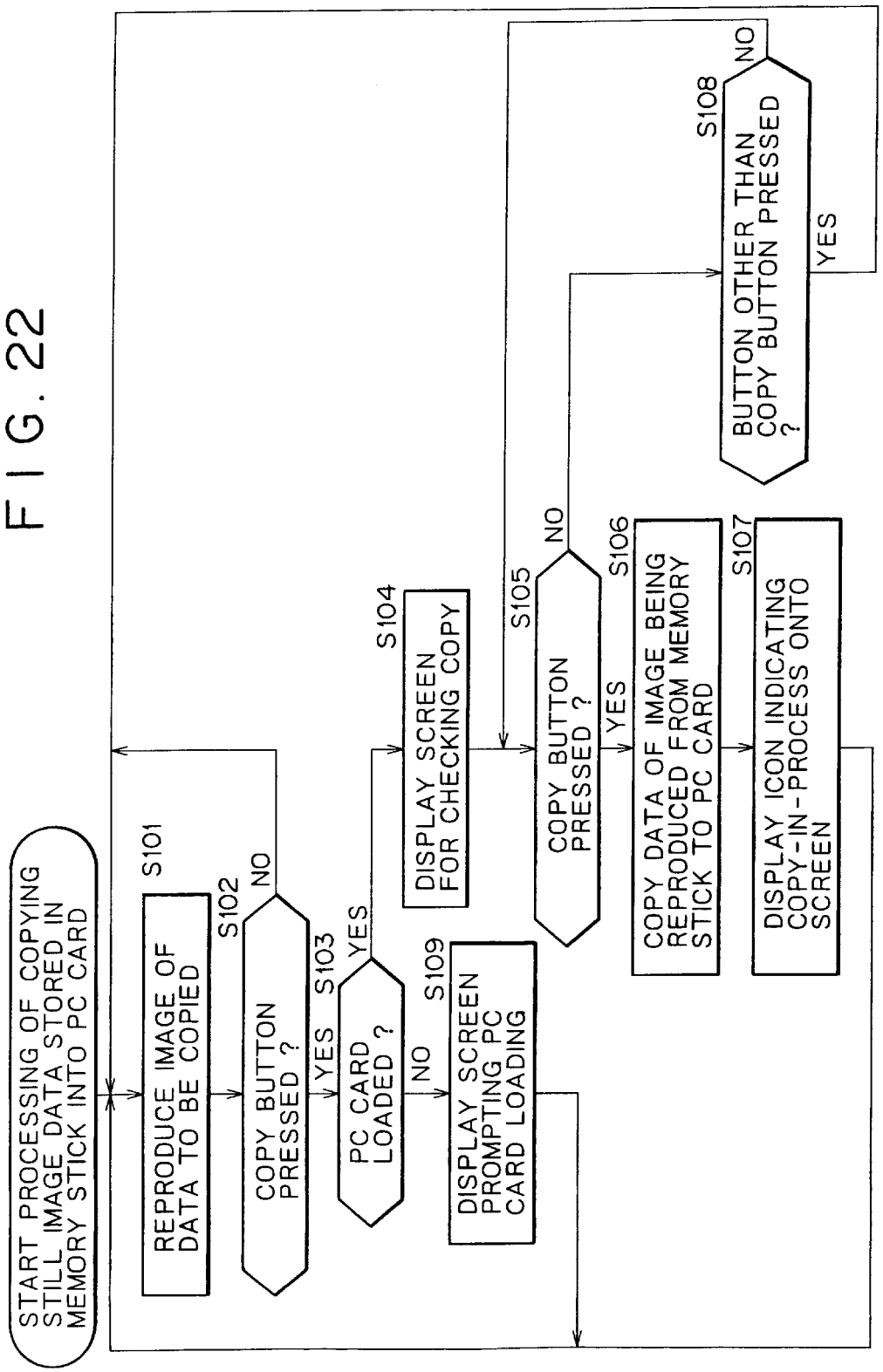
FIG. 22 is a flowchart for describing the processing of copying a still image from the Memory Stick 10 to the PC card 9.

The following describes, with reference to the flowchart shown in FIG. 22, the processing of copying still image data stored in the Memory Stick 10 into the PC card 9. In step S101, the user loads the Memory Stick 10 in which copied still image data are stored into the Memory Stick connector 13 to reproduce an image corresponding to the data to be copied. In step S102, the controller 67 of the signal converter 1 determines, on the basis of a signal supplied from the receive block 72, whether the copy button of the remote commander 2 has been pressed. If the copy button is found not pressed, then, back to step S101, the controller 67 repeats the above-mentioned processing until the copy button is pressed.

If, in step S102, the copy button is found pressed, then, in step S103, the controller 67 determines, on the basis of a signal supplied from the PC card interface 65, whether the PC card 9 is loaded in the PC card connector 12. If the PC card 9 is found loaded, then, in step S104, the controller 67 causes the superimpose block 68 to display a screen of copy acknowledgment.

In step S105, the controller 67 determined, on the basis of a signal supplied from the receive block 72, whether the copy button of the remote commander 2 has been pressed. If the copy button is found pressed, then, in step S106, the controller causes the Memory Stick interface 66 to read the data corresponding to the reproduced image from the Memory Stick 10 and causes the PC card interface 65 to write these data to the PC card 9.

In step S107, the controller 67 causes the superimpose block 68 to display the icon shown in FIG. 18 indicative that copy is being executed. Then, back to step S101, the controller 67 repeats the copy processing.

If, in step S105, the copy button is found not pressed, then, in step S108, the controller determines, on the basis of a signal supplied from the receive block 72, whether a button other than the copy button on the remote commander 2 has been pressed. If no button other than the copy button is found not pressed, it indicates that none of the buttons on the remote commander 2 has been pressed. Therefore, back to step S105, the controller 67 repeats the above-mentioned processing until the remote commander 2 is operated.

If, in step S108, a button other than the copy button is found pressed, it indicates that the copy operation has been canceled. Then, back to step S101, the controller 67 repeats the image data copy processing.

If, in step S103, the PC card 9 is found not loaded in the PC card connector 12, then, in step S109, the controller 67 causes the superimpose block 68 to display a screen for prompting the loading of the PC card 9. Then, back to step S101, the controller 67 repeats the image data copy processing.

Thus, the signal converter 1 copies predetermined still image data from the Memory Stick 10 to the PC card 9. The processing for copying predetermined still image data from the PC card 9 to the Memory Stick 10 is executed in generally the same manner except that copy is made in the opposite direction. Also, the data of a plurality of still images being index-reproduced may be copied.

Figure 23:
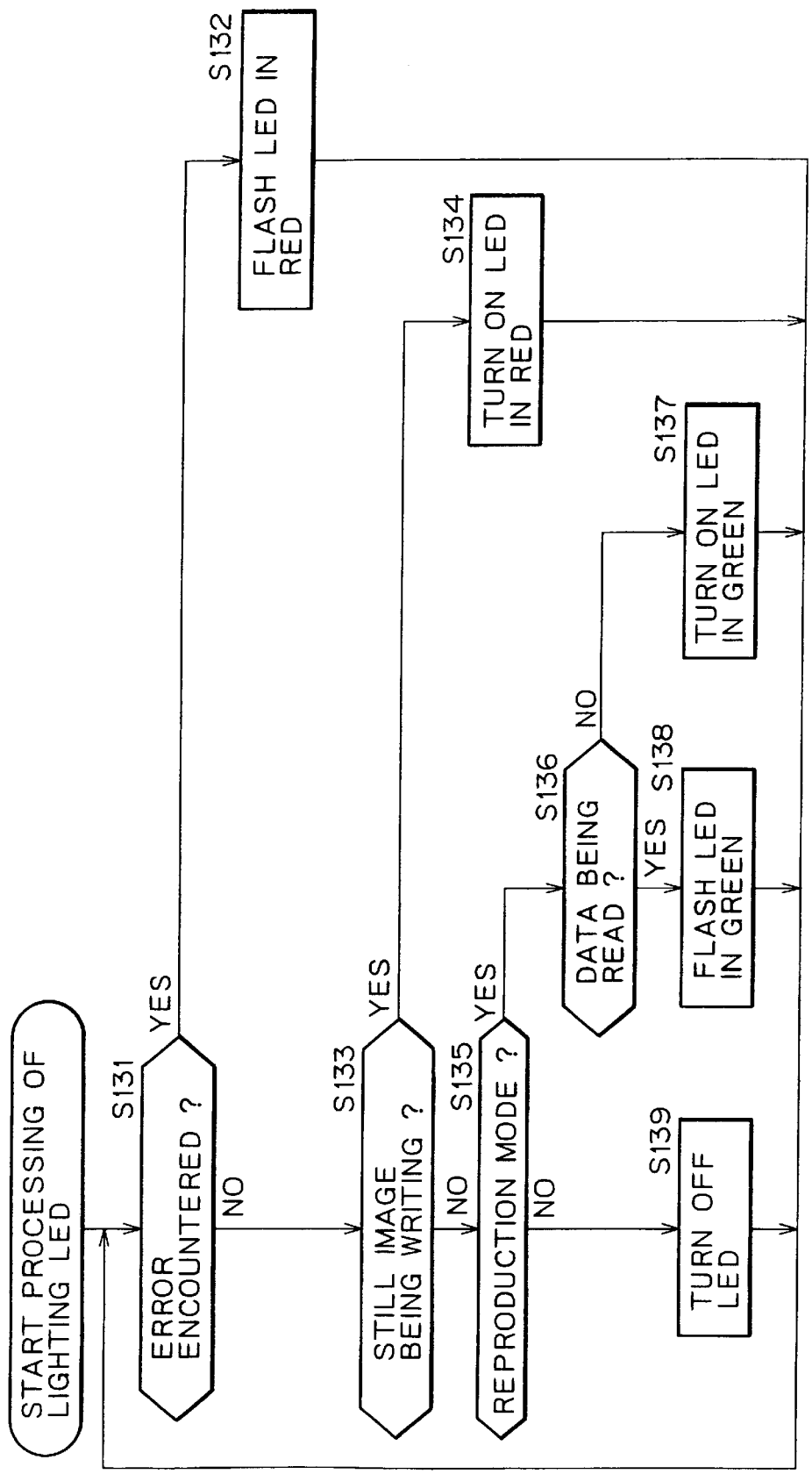
FIG. 23 is a flowchart for describing the processing of lighting a LED 14.

The following describes, with reference to the flowchart shown in FIG. 23, the processing of turning on the LED 14 indicative of the state of the Memory Stick 10 loaded in the Memory Stick connector 13. In step S131, the controller 67 of the signal converter 1 determines, on the basis of a signal supplied from the Memory Stick interface 66, whether an error has occurred on the Memory Stick 10. If an error is found, then, in step S132, the controller 67 causes the LED 14 of the display block 70 to flash red. Then, back to step S131, the controller repeats the processing.

If, in step S131, no error is found, then, in step S133, the controller 67 determines, on the basis of a signal supplied from the Memory Stick interface 66, whether still image data are written to the Memory Stick 10 loaded in the Memory Stick connector 13. If the data are found being written, then, in step S134, the controller causes the LED 14 to flash red. Then, back to step S131, the controller repeats the processing.

If, in step S133, the still image data are not found written to the Memory Stick 10, then, in step S135, the controller 67 determines whether a still image stored in the Memory Stick 10 is being reproduced. If the still image is found being reproduced, then, in step S136, the controller 67 determines whether the still image data stored in the Memory Stick 10 are being read.

If, in step S136, the still image data are found not being read, then, in step S137, the controller 67 turns on green the LED 14 of the display block 70. Then, back to step S131, the controller 67 repeats the processing.

If, in step S136, the still image data stored in the Memory Stick 10 are found being read, then, in step S138, the controller flashes green the LED 14. Then, back to step S131, the controller 67 repeats the processing.

If, in step S135, the still image stored in the Memory Stick 10 is found not being reproduced, then, in step S139, the controller turns off the LED 14. Then, back to step S131, the controller 67 repeats the processing.

Thus, the controller 67 turns on or off the LED 14 according to the state of the Memory Stick 10 loaded in the Memory Stick connector 13. Likewise, the controller 67 turns on or off the LED 17 according to the state of the PC card 9 loaded in the PC card connector 12.

In the above description, the PC card 9 or the Memory Stick 10 are loaded on the signal converter 1. It will be apparent to those skilled in the art that other storage media such as SmartMedia (trademark) and CompactFlash (trademark) may also be used.

Also, in the above description, digital video data of DV VCR format are inputted in the signal converter 1 and these data are outputted therefrom. It will be apparent to those skilled in the art that the digital video data may also be compressed by MPEG (Moving Picture Experts Group) format. It will be also apparent to those skilled in the art that the digital video data may be stored on a disc or a solid memory in addition to a magnetic tape or inputted/outputted via a network or a communication satellite.

In the above description, when copying a still image from the PC card 9 to the Memory Stick 10, the signal converter 1 displays the icon 101, the icon 102, and the icon 106 in the center of the screen of the monitor 5. It will be apparent to those skilled in the art that, when copying a moving image from the digital VTR 3 to the VTR 7 for example, the signal converter 1 may display in the upper right corner of the screen the icons representative of the digital VTR 3, the VTR 7, and the operation of copying a moving image. Furthermore, it will be apparent to those skilled in the art that, when copying a still image from the Memory Stick 10 to a Memory Stick loaded on the digital VTR 3 for example, the signal converter 1 may display the icon 101, the icon 106, and an icon representative of the Memory Stick loaded on the digital VTR 3.

It should be understood that the controller 67 of the signal converter 1 may cause the superimpose block 68 to display a predetermined icon or character corresponding to the use state of the Memory Stick 10 instead of turning on/off the LED 14.

Also, it should be understood that storage media for providing the computer programs for executing the above-mentioned processing may be communication media such as networks and communication satellites in addition to recording media such as a magnetic disc, CD-ROM, and solid memory.

While the preferred embodiments of the present invention have been described using specific terms, such description is for illustrative purposes only, and it is to be understood that changes and variations may be made without departing from the spirit or scope of the appended claims.

What is claimed is:

1. An image processing apparatus on which a first storage medium and a second storage medium are loaded, comprising:

a first converting means for converting inputted first digital video data into a first still image, a second still image stored in said first storage medium into second digital video data, and a third still image stored in said second storage medium into third digital video data;

a second converting means for converting an inputted first analog video signal into a fourth still image, the second still image stored in said first storage medium into a second analog video signal, and the third still image stored in said second storage medium into a third analog video signal;

a first read/write means for writing one of said first still image converted by said first converting means, said fourth still image converted by said second converting means and said third still image stored in said second storage medium to said first storage medium, and reading said second still image stored in said first storage medium;

a second read/write means for writing one of said first still image converted by said first converting means, said fourth still image converted by said second converting means and said second still image stored in said first storage medium to said second storage medium, and reading said third still image stored in said second storage medium; and a control means for controlling said first converting means, said second converting means, said first read/write means, and said second read/write means, wherein said first storage medium and said second storage medium have different shapes relative to the other and are configured for manual loading and extraction, and said first read/write means and said second read/write means being adjacently disposed about opposing sides of a board.

2. The image processing apparatus according to claim 1, further comprising:

a remote commander; and a command receiving means through which said image processing apparatus is operated by said remote commander.

3. The image processing apparatus according to claim 1, wherein said first storage medium is a PC card and said second storage medium is a removable memory device.

4. The image processing apparatus according to claim 1, wherein said first digital video data, said second digital video data, and said third digital video data are based on digital video, video cassette recorder (DV VCR) format.

5. The image processing apparatus according to claim 1, wherein said first still image, said second still image stored in said first storage medium, said second still image stored in said second storage medium, said third still image stored in said first storage medium, said third still image stored in said second storage medium, and said fourth still image are based on Joint Picture Expert Group (JPEG) format.

6. An image processing method for an image processing apparatus on which a first storage medium and a second storage medium are loaded, said first storage medium and said second storage medium having different shapes relative to the other, said first storage medium being configured for manual loading and extraction in a first storage unit, said second storage medium being configured for manual loading and extraction in a second storage unit, and said first storage unit and said second storage unit being adjacently disposed about opposing sides of a board, the method comprising:

first converting inputted first digital video data into a first still image, a second still image stored in said first storage medium into second digital video data, and a third still image stored in said second storage medium into third digital video data;

second converting an inputted first analog video signal into a fourth still image, a second still image stored in said first storage medium into a second analog video signal, and a third still image stored in said second storage medium into a third analog video signal;

first writing one of said first still image converted by said first converting, said fourth still image converted by said second converting and a third still image stored in said second storage medium to said first storage medium, and first reading said second still image stored in said first storage medium;

second writing one of said first still image converted by said first converting, said fourth still image converted by said second converting and said second still image stored in said first storage medium to said second storage medium, and second reading said third still image stored in said second storage medium; and controlling said first converting, said second converting, said first writing and reading, and said second writing and reading.

7. An information providing medium for providing a computer-readable program for having an image processing apparatus on which a first storage medium and a second storage medium are loaded, said first storage medium and said second storage medium having different shapes relative to the other, said first storage medium being configured for manual loading and extraction in a first storage unit, said second storage medium being configured for manual loading and extraction in a second storage unit, and said first storage unit and said second storage unit being adjacently disposed about opposing sides of a board, the computer-readable program to execute processing including:

first converting inputted first digital video data into a first still image, a second still image stored in said first storage medium into second digital video data, and a third still image stored in said second storage medium into third digital video data;

second converting an inputted first analog video signal into a fourth still image, a second still image stored in said first storage medium into a second analog video signal, and a third still image stored in said second storage medium into a third analog video signal;

first writing one of said first still image converted by said first converting, said fourth still image converted by said second converting and a third still image stored in said second storage medium to said first storage medium, and first reading said second still image stored in said first storage medium;

second writing one of said first still image converted by said first converting, said fourth still image converted by said second converting and said second still image stored in said first storage medium to said second storage medium, and second reading said third still image stored in said second storage medium; and controlling said first converting, said second converting said first writing and reading, and said second writing and reading.

8. An image processing apparatus on which a first storage medium and a second storage medium are loaded, comprising:

a first converter configured to convert inputted first digital video data into a first still image, a second still image stored in said first storage medium into second digital video data, and a third still image stored in said second storage medium into third digital video data;

a second converter configured to convert an inputted first analog video signal into a fourth still image, a second still image stored in said first storage medium into a second analog video signal, and a third still image stored in said second storage medium into a third analog video signal;

a first read/write circuit configured to write one of said first still image converted by said first converter, said fourth still image converted by said second converter and said third still image stored in said second storage medium to said first storage medium, and to read said second still image stored in said first storage medium;

a second read/write circuit configured to write one of said first still image converted by said first converter, said fourth still image converted by said second converter and said second still image stored in said first storage medium to said second storage medium, and to read said third still image stored in said second storage medium; and a controller configured to control said first converter, said second converter, said first read/write circuit, and said second read/write circuit, wherein said first storage medium and said second storage medium have different shapes relative to the other and are configured for manual loading and extraction, and said first read/write circuit and said second read/write circuit being adjacently disposed about opposing sides of a board.

9. The image processing apparatus according to claim 8, further comprising:

a remote commander; and a command receiver through which said image processing apparatus is operated by said remote commander.

10. The image processing apparatus according to claim 8, wherein said first storage medium is a PC card and said second storage medium is a removable memory device.

11. The image processing apparatus according to claim 8, wherein said first digital video data, said second digital video data, and said third digital video data are based on digital video, video cassette recorder (DV VCR) format.

12. The image processing apparatus according to claim 8, wherein said first still image, said second still image stored in said first storage medium, said second still image stored in said second storage medium, said third still image stored in said first storage medium, said third still image stored in said second storage medium, and said fourth still image are based on Joint Picture Expert Group (JPEG) format.

* * * * *